May 14, 1963   J. BERTELS   3,089,725
TILTABLE CONTAINER FOR TRANSPORTING BULK MATERIALS
Filed Dec. 26, 1961   2 Sheets-Sheet 1

Josef Bertels
INVENTOR

BY Nolte and Nolte

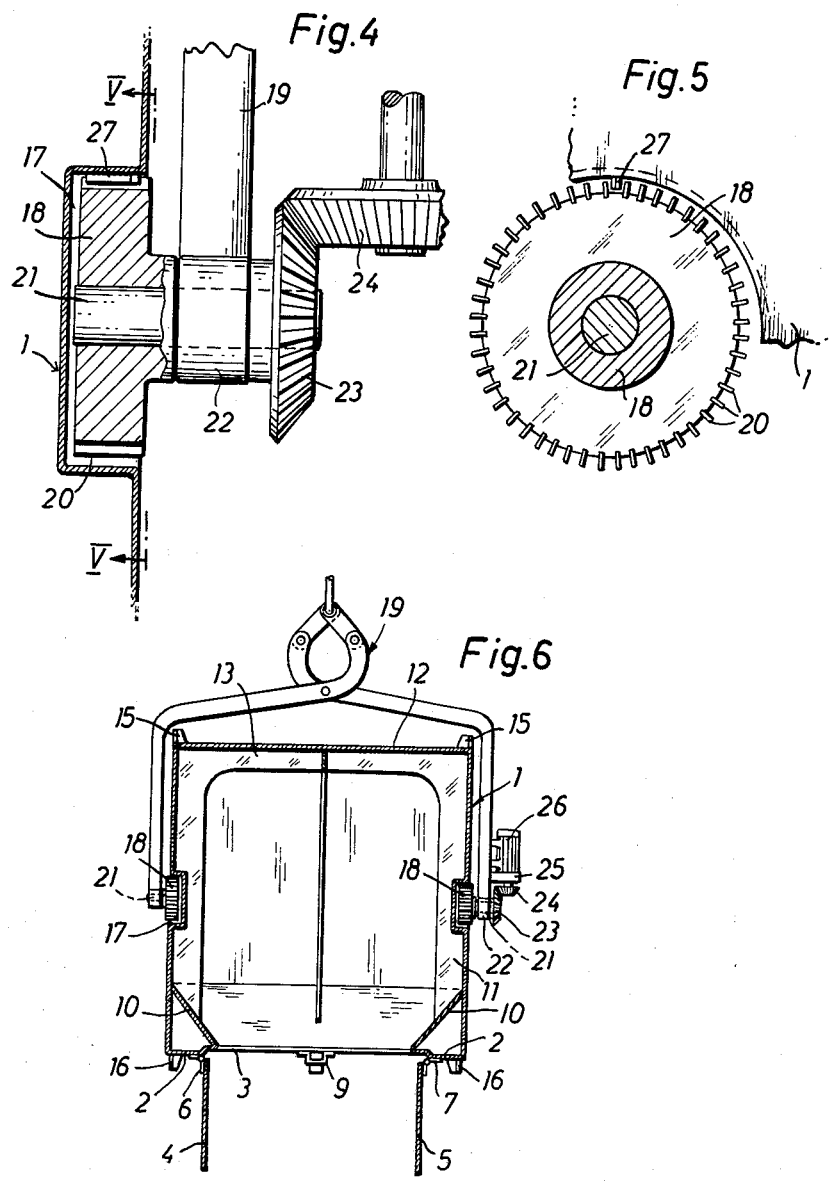

3,089,725
TILTABLE CONTAINER FOR TRANSPORTING BULK MATERIALS

Josef Bertels, Berzdorf-Wesseling, near Cologne, Germany, assignor to Wibau Westdeutsche Industrie-u. Strassenbau - Maschinen - Gesellschaft m.b.H., Gelnhausen, Germany
Filed Dec. 26, 1961, Ser. No. 162,138
Claims priority, application Germany Dec. 30, 1960
10 Claims. (Cl. 294—73)

The present invention relates to containers used for transporting materials, and more particularly to a tiltable type suitable for bulk materials.

There are known containers of this type which have closable filling and emptying apertures in their top walls. The containers are filled in the normal, upright position, while emptying is carried out in a tilted, top-down position, the bulk material being discharged upon releasing the closure means of the aperture lid. In order to facilitate the discharging process and assure complete emptying of the containers, their top walls are usually shaped so as to taper conically toward the apertures.

It is the object of the present invention to improve this kind of transport container by providing inner baffle plates in the region of the top wall, adapted to guide the bulk material toward the aperture when the container is tilted for emptying. Another object is to provide inner reinforcing means for the container envelope and walls, so that relatively thin material can be used without endangering the rigidity and wear resistance of the container, even when loaded with heavy bulk materials. It is a third object to provide the container with lateral, coaxial recesses adapted to receive holding and lifting members of, e.g., a fork-lift truck, crane or the like. By applying suitable entrainment members, the transport container may be tilted by the intermediary of the crane lifting members, as will be described hereunder in full detail.

It is one of the major features of this invention that the tiltable container is given the shape of a parallelepipedon with substantially quadratic cross-section which has a substantially rectangular filling and emptying aperture, the peripheral portions of the top wall around the aperture being provided with baffle plates sloping toward the lateral envelope surfaces at an angle of about 45 degrees. Owing to this arrangement, the bulk material can easily be discharged from all sides of the container.

The inventive container has uninterrupted, plane walls and is very simple and economical to manufacture. Owing to the quadric cross-section, great savings of space are achieved, since there is no dead space between the containers in the storage and/or transporting spaces.

The inner reinforcing members include one or more vertical ribs adjacent the envelope walls and extending down to the bottom wall of the container, and supplementary ribs interconnecting two opposite vertical ribs at the bottom of the container. The internal arrangement of the reinforcing means lends the container uninterrupted outer surfaces so that the volume is not unnecessarily increased by the provision of outer ribs.

Two opposite envelope walls have cylindrical recesses, coaxial with respect to each other and adapted to be engaged by holding and tilting pivots of the crane or the like used for handling the container. Without having externally protruding members, the container can thus be easily gripped and lifted by the crane; tilting may be accomplished manually or mechanically.

Other objects and many of the attendant advantages of the invention will be readily appreciated as the same becomes better understood by reference to the following detailed description, when considered with the accompanying drawing, wherein—

FIG. 4 shows a holding and tilting member of a crane in connection with a portion of the inventive container;

FIG. 5 is a partly sectional view taken along line V—V of FIG. 4; and

FIG. 6 is a vertical cross-sectional view similar to that of FIG. 1, but showing the container in its tilted, top-down position.

Figure 1:
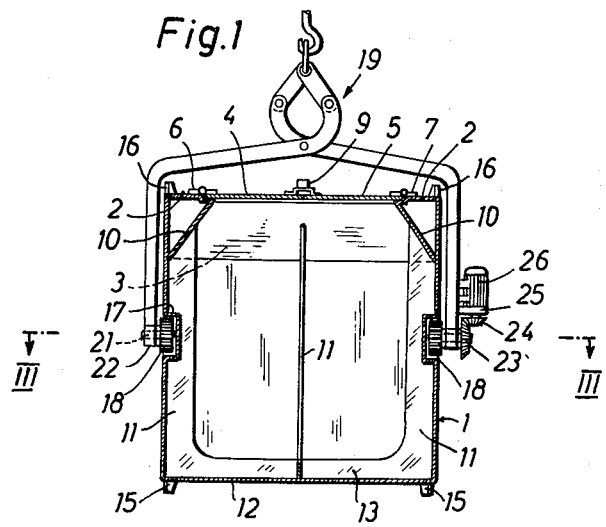
FIG. 1 is a vertical cross-sectional view through a tiltable container according to the invention, suspended from a crane in an upright position.
Figure 2:
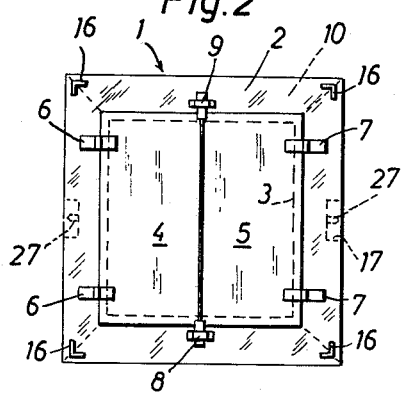
FIG. 2 is a top view of the container.
Figure 3:
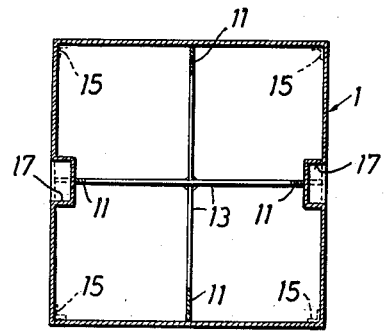
FIG. 3 is a sectional view taken along line III—III of FIG. 1.

The container generally designated 1 has the shape of a quadratic parallelepipedon having a top wall 2 provided with a preferably rectangular filling and emptying aperture 3. The latter can be closed by means of lids 4 and 5, connected to the top wall by means of respective hinges 6 and 7. In the closed position, the lids completely cover the aperture 3. Two lateral latches 8 and 9 are attached to opposite sides of the top wall, for simultaneously holding the lids 4 and 5 in their closed position. Preferably, the top wall 2 is somewhat recessed in the region of the lids 4 and 5 so that a flat surface is presented without protruding or elevated portions, except for the lid hinges and the latches.

Inside the container 1, around the peripheral portions of the top wall 2, downwardly slanting baffle plates 10 are provided which run from the top wall, close to the edges of aperture 3, at about 45 degrees to the envelope walls to which they are connected, e.g., by welding. This makes for adequate strutting of the top wall against the envelope walls.

The inventive container may have an aperture relatively large with respect to or almost identical with the inner cross-section. Hence, the filling and particularly the emptying of the container is greatly facilitated; there is no risk for the bulk material to overbridge or otherwise obstruct the discharge aperture, e.g. in case of materials liable to conglomerate.

Each side wall has a vertical rib 11 attached thereto substantially midway between the corners. The ribs are connected to the baffle plates 10 and reach down to the bottom wall 12. In this region, opposite pairs of the ribs 11 are interconnected by supplementary ribs 13 attached to the bottom wall. The transitions between the ribs 11 and 13 are rounded off, providing joints rigid against torsional stresses. Owing to this arrangement, the envelope walls and the bottom wall are sufficiently reinforced so that they can be made from relatively thin material which will still be able to withstand the rough handling inherent with containers of this kind of transport.

The bottom wall 12 is fitted with legs 15, preferably of a height allowing the prongs of a fork-lift truck or similar device to engage the container from below. For putting down the container in its tilted position, if need be, the top wall 2 is also equipped with legs 16. These have an arrangement and shape so as to complement the legs 15 of the container if stacked one atop the other. A high degree of safety and rigidity is thus ensured when several containers have to be superposed, e.g. in a vehicle or a store-room.

About in the centers of two opposite envelope walls, coaxial, cylindrical recesses 17 are provided which serve to receive from outside correspondingly shaped pivots 18 secured to holding or lifting members of a crane or the like. As a matter of example, a crane clamp 19 is schematically shown, to which the pivots 18 are secured. The crane can thus easily grip, transport and put down the container, the latter being axially tiltable around the aligned pivots and recesses. The recesses being within the confines of the container envelope, there are no protruding portions which would take up valuable extraneous space. The tilting may be performed manually.

The cylindrical recesses 17 also provide a simple expedient for mechanically performing the tilting of the container. The pivots 18 of the crane clamp 19 are therefore fitted with peripheral, parallel teeth 20 (FIGS. 4 and 5). These consist preferably of short pieces of flat iron cast into the circumference of the pivots 18. The latter are secured to shafts 21 which, in turn, are rotatably held in bearings 22 of the two limbs of the crane clamp 19, without being axially shiftable. One of the shafts 21 has, on the side opposite the pivot 18, a bevel gear 23 attached thereto which meshes with another gear 24 driven, through the intermediary of a reduction gear 25, by a motor 26 supported on the clamp 19.

Each of the recesses 17 has on its inner periphery an engaging member 27 which acts as a driver between the crane clamp and the container. The measurements of the members 27 are such that they fit between two neighboring teeth 20 of the pivots 18. The opposite edges of the members 27 and the pivot teeth 20 are tapering in the shape of a wedge or knife edge, whereby the introduction of the members is facilitated between the teeth.

It is advisable to use crane clamps of the rope-grab type (not shown), particularly for heavier containers, so that the limbs of the clamp may be approached and separated by means of a motor winch, for respectively gripping or releasing the containers.

At the point of destination, the containers filled with bulk material are each gripped with the crane clamp and transported in a suspended condition to the discharge station, e.g. a tank or bunker. Upon energizing the motor 26, one of the pivots 18 is set to rotation. Since this is in rigid engagement with the member 27 of the respective recess 17, the container follows the rotation and is axially tilted around the pivots 18. Upon having performed a 180 deg. rotation, the motor is stopped; the top wall 2 now points downward. Upon releasing the latches 8, 9, the lids 4, 5 will open on effect of the weight of the material which then flows out from the container. The slanting baffle plates 10 let the bulk material run from all sides towards the aperture 3 where it is discharged.

Upon having completed the discharging process, the lids are closed and latched, the motor is again energized and the container turned back into its original upright position. It is then ready for transportation back to the loading station for the next trip.

Since both of the recesses 17 of the container are fitted with a member 27, the pivot 18 driven by the motor 26 can be selectively inserted into either side of the container. The crane operator or the personnel handling the containers does not have to watch for a particular side of the container to be engaged by the driven crane clamp side. It will be understood, of course, that the pivot opposite the driven side may be smooth or provided with teeth, as shown in the drawings.

It should be understood, of course, that the foregoing disclosure relates only to a preferred embodiment of the invention and that it is intended to cover all changes and modifications of the example described which do not constitute departures from the spirit and scope of the invention as set forth in the appended claims.

I claim:

1. A tiltable container for transporting bulk materials, comprising a body substantially in the shape of a parallelepipedon having a top wall, a bottom wall and an envelope forming side walls, said body being adapted to be stacked in contiguous rows and superimposed tiers of identical containers in a gapless and space-saving manner, an emptying and filling aperture in said top wall, closure means in said top wall for said aperture, baffle plates extending within the container from peripheral regions of said top wall to said envelope, for guiding said bulk material towards said aperture when the container is tilted in a top-down position for discharging said bulk materials and coaxial recesses formed in two opposite side walls substantially within a horizontal plane including the center of gravitation of the container, said recesses forming engaging means adapted to receive from outside holding members of an external lifting device for grabbing, lifting, transporting and tilting the container, all portions of said engaging means falling within the space defined between said two side walls.

2. A tiltable container according to claim 1, wherein said baffle plates are tilted substantially at 45 degrees toward and touch both said envelope and said top wall.

3. A tiltable container according to claim 1, wherein said aperture is rectangular, said closure means including at least one lid somewhat larger than said aperture, and at least one latch means for holding said lid in its closed position.

4. A tiltable container according to claim 1, wherein said aperture is angular, said closure means including two lid portions attached along opposite, parallel edges and somewhat larger together than said aperture, and two latch means on opposite sides of said top wall for holding both of said lid portions in their closed position.

5. A tiltable container according to claim 4, further comprising legs secured to said bottom wall having a height at least that of said latch means so that the container may safely be placed atop an identical container, said legs of the container clearing the latch means of said identical container.

6. A tiltable container according to claim 1, further comprising at least two stiffening ribs attached at least partly to said baffle plates and also to opposite side walls substantially midway between the envelope corners in a substantially vertical direction, and at least one supplementary rib interconnecting said stiffening ribs in the region of said bottom wall.

7. A tiltable container according to claim 6, wherein said stiffening ribs are rigidly connected to said baffle plates, and the latter are rigidly connected to said side walls, while said supplementary rib is connected to said bottom wall, whereby the rigidity of the container is enhanced.

8. A tiltable container according to claim 1, wherein both said recesses and said holding members of the external lifting device are cylindrical so that the container may be tilted axially around said recesses and members for discharging said bulk materials.

9. A tiltable container according to claim 8, further comprising a plurality of peripherally arranged teeth on at least one of said holding members and a driver member in at least one of said recesses for mutual engagement, whereby the external lifting device is adapted to axially and continuously tilt the container.

10. A tiltable container according to claim 9, wherein the edges of said teeth and said driver member opposite each other while introducing said one holding member into said one recess have corresponding tapering wedge shapes for easier meshing with each other.

References Cited in the file of this patent

UNITED STATES PATENTS

| | | |
|---|---|---|
| 2,035,838 | Reeder | Mar. 31, 1936 |
| 2,758,742 | Farrell | Aug. 14, 1956 |
| 2,796,283 | Grazier | June 18, 1957 |
| 2,959,444 | Callender | Nov. 8, 1960 |